United States Patent [19]

Gibson

[11] 4,143,458

[45] Mar. 13, 1979

[54] METHOD OF MAKING A THIN FILM MAGNETIC HEAD ASSEMBLY

[75] Inventor: George W. Gibson, Goleta, Calif.

[73] Assignee: Applied Magnetics Corporation, Goleta, Calif.

[21] Appl. No.: 809,924

[22] Filed: Jun. 24, 1977

[51] Int. Cl.² .............................................. G11B 5/42
[52] U.S. Cl. .......................................... 29/603; 65/42; 65/43; 65/59 B; 360/127; 360/129
[58] Field of Search .................. 29/603; 360/127, 129; 65/42, 43, 59 B

[56] References Cited

U.S. PATENT DOCUMENTS

| | | | |
|---|---|---|---|
| 3,344,237 | 9/1967 | Gregg | 29/603 X |
| 3,922,776 | 12/1975 | Alger et al. | 29/603 |
| 4,052,749 | 10/1977 | Nomura et al. | 360/127 X |

Primary Examiner—Carl E. Hall

Attorney, Agent, or Firm—Daniel J. Meaney, Jr.

[57] ABSTRACT

A method of making a thin film magnetic head assembly having a spaced substrate and superstrate with a thin film magnetic transducer mounted therebetween by the steps of positioning at least one spacing member between the substrate and superstrate, placing a quantity of insulating bonding material of selected characteristics adjacent the spaced substrate and superstrate and controllably heating the substrate, superstrate, thin film magnetic transducer and spacing member sub-assembly to a bonding temperature located in a bonding temperature range and maintaining the sub-assembly at a bonding temperature to enable the bonding material to substantially fill the space by capillary action thereby encapsulating the thin film magnetic transducer bonding the substrate, superstrate and thin film magnetic transducer into an integral assembly is shown.

9 Claims, 13 Drawing Figures

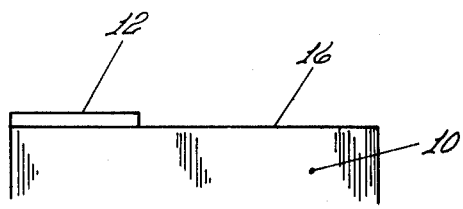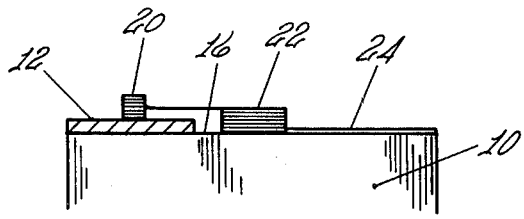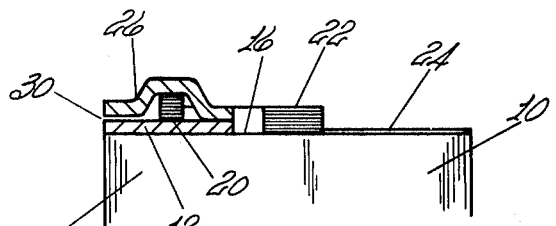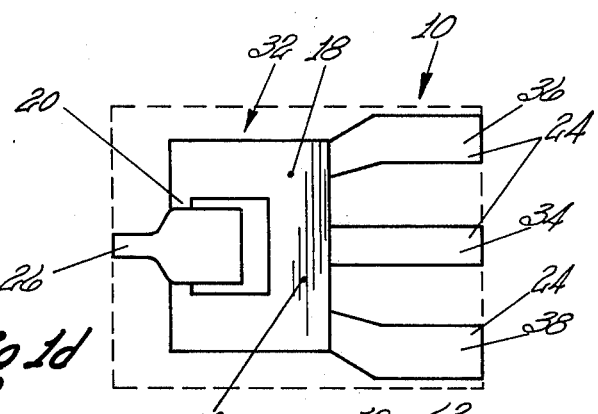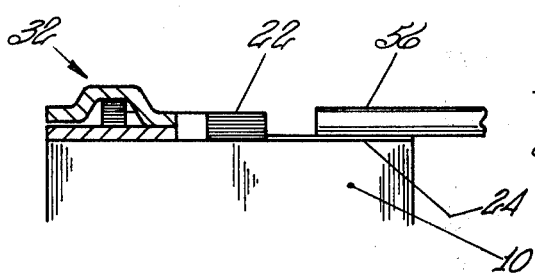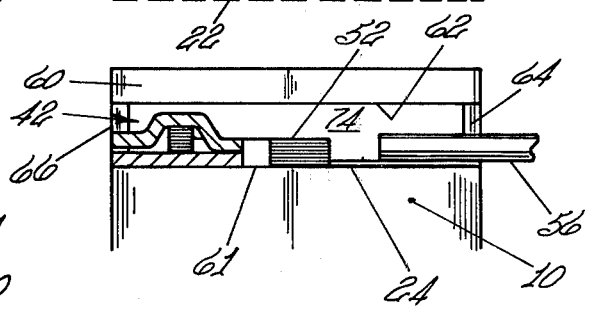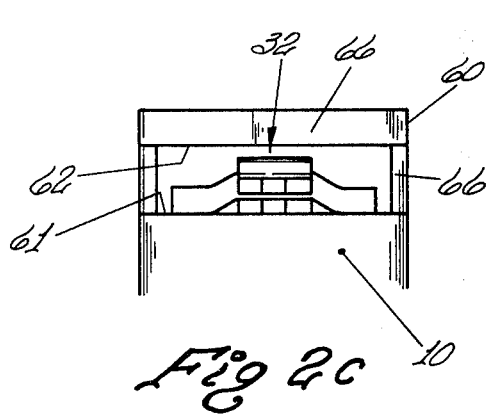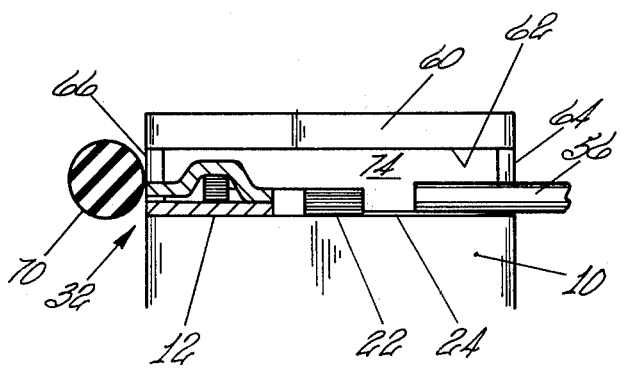

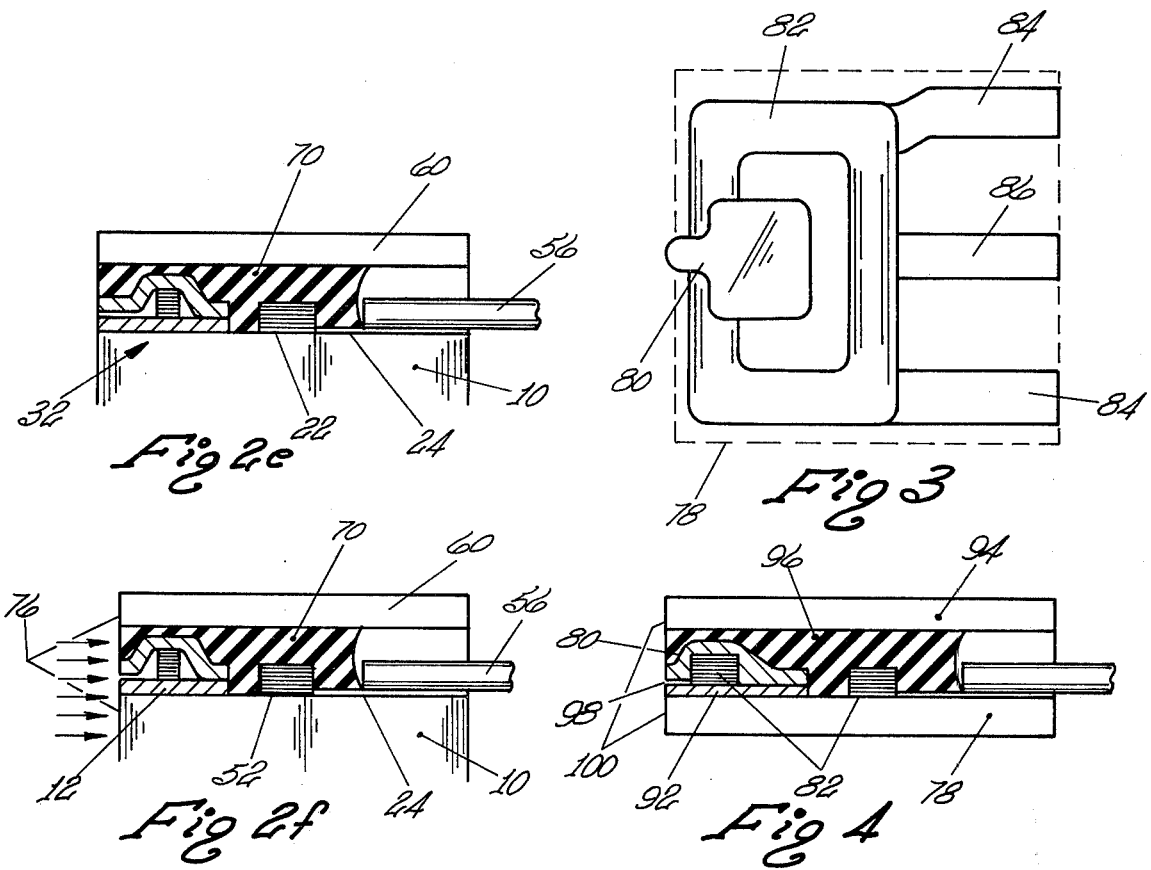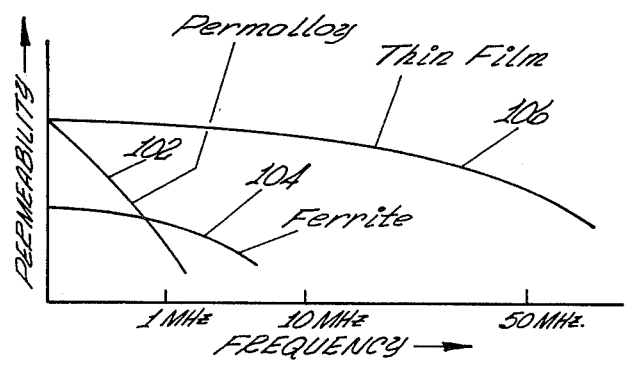

METHOD OF MAKING A THIN FILM MAGNETIC HEAD ASSEMBLY

BACKGROUND OF THE INVENTION

1. Field of the Invention

This invention relates to a new and novel thin film magnetic head assembly and, more particularly, to a thin film magnetic head having a substrate, superstrate, thin film magnetic transducer and glass bonding of the same into an integral assembly. Also, this invention relates to a method for manufacturing a thin film magnetic head assembly by use of at least one spacing member between the substrate and superstrate and by controllably heating the sub-assembly to enable the glass by capillary action to encapsulate the thin film magnetic transducer and bond the substrate and superstrate to form an integral magnetic head assembly.

2. Disclosure of the Prior Art

It is known in the art to manufacture ferrite magnetic heads having at least two pole pieces formed of sintered oxide ferromagnetic material with a short gap therebetween wherein the pole pieces are bonded together by glass. Typical of such known methods are the methods disclosed in U.S. Pat. Nos. 3,577,634, 3,246,383 and 3,024,318. Magnetic heads manufactured by the above known methods are combined with housings or ceramic sliders to form magnetic head assemblies used in apparatus, systems and equipment for storing and retrieving information in a recording media.

The prior art also discloses that magnetic transducers may be fabricated by vapor deposition or sputtering techniques to form thin film magnetic transducers. The resulting thin film magnetic transducers are extremely small in size relative to the ferrite magnetic transducers. Thin film magnetic head assemblies having thin film transducers are assembled by use of epoxy or other similar adhesive.

SUMMARY OF THE INVENTION

The present invention discloses, teaches and claims a significant improvement in fabrication and assembly of thin film magnetic head using a thin film, vapor deposited, magnetic transducer.

One of the present problems associated with the known thin film transducer is that heating of the same above about 500° C. causes irreversible damage to the magnetic and/or electrical characteristics of the thin film transducer. This is due to interaction between the magnetic material, conductive non-magnetic material and the insulating material used therein. The use of a glass bonding technique disclosed in the above referenced United States Patents require melting point temperatures of glass to be in the order of 900° C. One reason is to insure that the coefficiency of expansions of the ferrite and glass are substantially the same.

The present invention teaches a novel and unique method of assembling a thin film magnetic head assembly using a substrate, superstrate, thin film magnetic transducer selected insulating bonding material and at least one spacing member.

One advantage of the present invention is that a thin film magnetic head assembly can be fabricated having a thin film magnetic transducer using glass bonding techniques.

BRIEF DESCRIPTION OF THE DRAWING

The foregoing and other advantages and features of the invention will become apparent from the following description of the preferred embodiment when considered together with the illustrations in the accompanying drawings which includes the following figures:

FIGS. 1(a) to 1(d), inclusive, are schematic diagrams of the various steps of forming a thin film magnetic transducer on a substrate;

FIGS. 2(a) to 2(f), inclusive, are schematic diagrams of the steps of one embodiment for making a thin film magnetic head with a superstrate, spacing members, glass rod and heating the same to form an integral assembly and lapping the same to form a smooth surface;

FIG. 3 is a top view of another embodiment of a thin film transducer which may be fabricated into a thin film magnetic head;

FIG. 4 is another embodiment of a thin film magnetic head manufactured by the method disclosed herein; and FIG. 5 is a graph showing the permeability of various known magnetic transducers plotted as a function of frequency.

DESCRIPTION OF THE PREFERRED EMBODIMENT

FIGS. 1(a) to 1(d), inclusive, illustrate one embodiment of a method for vapor depositing a thin film magnetic transducer on a substrate 10. In FIG. 1(a), a lower pole piece 12, formed of a magnetic material such as iron oxide, is vapor deposited onto a relatively planar support surface 16 of substrate 10. The substrate 10 is formed of a glass or ceramic material such as glass substrate having a melting point temperature in the order of 600° C. or higher.

FIG. 1(b) discloses the next step whereupon coils formed of a conductive non-magnetic material, such as copper, are deposited in essentially rectangular patterns, shown as 18 in FIG. 1(d). One side of the rectangle 18 is affixed to the exposed surface of the lower pole piece 12, as shown by winding cross-section 20. A coil side 22 located on the opposite part of the side of the rectangular shaped pattern 18 is deposited directly on the surface 16 of substrate 10. The coil side 22 is connected to a terminal connector pad 24 which extends from the coil side 22, along surface 16 to the opposite edge of substrate 10 relative to the location of the lower pole piece 12.

FIG. 1(c) illustrates the next step where an upper pole piece 26 is deposited contiguous the lower pole piece 12. The portion of the upper pole piece 26 located adjacent the edge 28 of substrate 10 is spaced a predetermined distance from the lower pole piece 12 to form a gap 30 of a preselected length. In a typical embodiment, the gap has a dimension in the order of 10 microns or less. The thickness of the thin film transducer is determined by the thickness of the lower pole piece 12, coil section 20 and upper pole piece 26.

FIG. 1(d) shows a top view of a thin film magnetic transducer, generally shown as 32, which has been assembled or affixed to the top surface of the substrate 10. The upper pole piece 26 encloses a side portion of a coil, shown generally as 22, such that the side 20 is enclosed by the pole pieces 12 and 26. The other side 22 of coil 18 is electrically connected to terminal connector pads, generally shown as 24. In the embodiment of FIG. 1(d), the coil connection pads have a center tab 34 and end tabs designated as 36 and 38.

FIG. 2(a) illustrates the thin film magnetic transducer 32 being mounted on the substrate 10 forming a substrate-thin film magnetic transducer sub-assembly. The coil 22 is electrically connected to terminal connector pad 24. Coil connector pad 24 has a lead 56 electrically connected thereto which functions to electrically connect the thin film magnetic transducer to an output circuit.

FIG. 2(b) illustrates the next step of the process wherein a superstrate 60 is positioned above substrate 10. The surface of substrate 10, which has the thin film magnetic transducer 32 mounted thereon, may be considered a support surface. The surface 62 of the superstrate 60 positioned opposite the support surface 61 may be considered a protective surface.

The spacing between the substrate 10 and superstrate 60 is determined by the width of spacing members 64 and 66.

FIG. 2(d) illustrates one embodiment for positioning at least one spacing member having a thickness at least equal to the thickness of the thin film magnetic transducer 32 located between the substrate 10 and superstrate 60.

FIG. 2(d) shows the next step of placing a quantity of an insulating bonding material 70 adjacent the spaced opposed edges and in the vicinity of the transducing portion of the thin film magnetic transducer 32. The insulating bonding material is selected of material which is electrically and magnetically compatible with the thin film magnetic transducer and which has a melting point temperature below a thermal stress temperature at which at least one of the electrical characteristics and the magnetic characteristics of the thin film magnetic transducer are permanently distorted.

In one embodiment, the glass selected was Corning Type 8463 glass having a melting point temperature of 450° C. The thin film magnetic transducer 32 has a thermal stress temperature of about 500° C., at which point the magnetic pole piece appears to interact with the coils and sio$_2$ insulation therebetween.

FIG. 2(e) shows the next step of controllably heating the substrate 10, superstrate 60, thin film magnetic transducer 32 and the spacing members 64 and 66 sub-assembly at a heating rate which permits substantially uniform expansion thereof up to a bonding temperature located in a bonding temperature range between the melting point temperature of the insulating bonding material and below the thermal stress temperature of transducer 32. The heated sub-assembly is maintained at a bonding temperature within the bonding temperature range for a time period sufficient to enable the insulating bonding material 70 by capillary action to substantially fill the space between the substrate 10 and superstrate 60 and to encapsulate said thin film magnetic transducer 32 therebetween and form a magnetic head assembly.

In determining the effect of the desired capillary action, two crucial variables determine the extent of capillary flow which are: (1) degree of surface tension as indicated by the minicus; and (2) the wetting angle formed by miniscus. The formula which determines the extent of capillary flow is $$h = (2\, T \cos \alpha)/rp; \quad (1)$$

wherein
T = surface tension
α = wetting angle
r = ½ the width of the channel
p = the density of the liquid.

In the above embodiment of FIG. 2(c), the glass is in the form of a thin, cylindrical shaped rod having a cross-sectional diameter which is slightly greater than the width of the space 74 formed therebetween.

After the glass 70 has substantially filled space 74 by capillary action, the sub-assembly is controllably cooled at a cooling rate which permits substantially uniform contractions thereof, to an ambient temperature.

FIG. 2(f) shows the next step wherein the adjacent spaced opposed edges of the substrate 10 and superstrate 60 are lapped, using techniques known to the art, to form a treated surface. The transducing portion of the thin film magnetic transducer 32 formed by pole pieces 12 and 26 are exposed to and planar with the treated surface 76. The spacing member 66 has been removed.

FIG. 3 shows a top view of another embodiment of a thin film magnetic transducer on a substrate 78 having a top pole piece 80, coil 82, and terminal pads 84 and 86.

FIG. 4 shows the thin film magnetic transducer assembly of FIG. 3 wherein the substrate 78, a superstrate 94, enclose a transducer 92 having a top pole piece 80, bottom pole piece 92 and coil 82. The glass bonding material 96 bonds the substrate 78, superstrate 74 and transducer 98 together. The edges of pole pieces 90 and 92 are exposed to and form part of the treated, lapped surface 100.

FIG. 5 illustrates the operational characteristics of a thin film magnetic transducer relative to the known prior art transducers formed of permalloy and ferrite. The permeability of the thin film transducer is substantially higher than that of permalloy or ferrite at high frequencies in the order of about 10 MHZ to 50 MHZ or higher. One reason is due to the extremely thin dimension of the elements forming the thin film transducer. Thus, the thin film magnetic transducer is highly susceptible to having its electrical and magnetic characteristics permanently distorted, or even destroyed, by raising the temperature thereof above a threshold level, which is referred to as the thermal stress temperature.

The thin film magnetic head assembly produced by the method of manufacture disclosed herein has wide utility. In operation, the head may be used in magnetic tape recording and reproducing apparatus, in disc files, in integrated data modules and with floppy discs, both single and double sided apparatus. One embodiment of a storage apparatus using the apparatus has bit packing densities in the order of 8000 bits per inch and frequency ranges to 7.5 megahertz using electronics normally used in ferrite magnetic heads. Improved devices may have bit packing densities of over 10,000 bits per inch and at a frequency range of above 10 megahertz.

What is claimed is:

1. A method of making a thin film magnetic head assembly having a substrate, a superstrate and a thin film magnetic transducer having preselected electrical characteristics and magnetic characteristics, mounted therebetween, said thin film magnetic transducer having a transducing portion thereof positioned adjacent opposed edges of the substrate and superstrate comprising positioning at least one spacing member having a thickness at least equal to the thickness of the thin film magnetic transducer between the substrate and the superstrate forming a predetermined space therebetween and spaced opposed edges at one periphery thereof;

placing a quantity of insulating bonding material adjacent the spaced opposed edges and in the vicinity of the transducing portion of the thin film magnetic transducer, said insulating bonding material being selected of a material which is electrically and magnetically compatible with the thin film magnetic transducer and which has a melting point temperature below a thermal stress temperature at which at least one of the electrical characteristics and the magnetic characteristics of the thin film magnetic transducer are permanently distorted;

controllably heating the substrate, superstrate, thin film magnetic transducer and the spacing member sub-assembly at a heating rate which permits substantially uniform expansion thereof up to a bonding temperature located in a bonding temperature range between the melting point temperature of the insulating bonding material and below the thermal stress temperature; and maintaining the heated sub-assembly at a bonding temperature within the bonding temperature range for a time period sufficient to enable the insulating bonding material by capillary action to substantially fill the space between the substrate and superstrate and to encapsulate said thin film magnetic transducer therebetween and form a magnetic head assembly.

2. The method of claim 1 further comprising the steps of positioning a second spacing member having a thickness at least equal to the thickness of the thin film magnetic transducer between the substrate and superstrate with one of said spacing members being positioned contiguous the spaced opposed edges and the other of said spacing members being positioned between the substrate and superstrate a spaced distance from said spaced opposed edges.

3. The method of claim 1 wherein the insulating bonding material is glass having a melting point temperature which is at least 40° C. less than the thermal stress temperature.

4. The method of claim 3 wherein the glass is in the form of a thin, cylindrical shaped rod having a cross-sectional diameter which is slightly greater than the width of the space between the substrate and superstrate.

5. The method of claim 4 wherein the melting point temperature of the glass rod is about 455° C. and the thermal stress temperature is about 500° C.

6. The method of claim 5 wherein the sub-assembly is heated to a bonding temperature in a temperature range of about 455° C. to about 500° C.

7. The method of claim 4 further comprising the steps of after the glass has substantially filled the space by capillary action, controllably cooling the sub-assembly at a cooling rate which permits substantially uniform contraction thereof to an ambient temperature.

8. The method of claim 7 comprising the steps of lapping the magnetic head assembly along the spaced opposed edges to form a treated surface having the transducing portion of the thin film magnetic transducer exposed as a part thereof.

9. The method of claim 8 further comprising the steps of attaching and electrically connecting conductors to the transducer portion of the thin film magnetic transducer.

* * * * *